US011226158B2

(12) United States Patent
Streeter

(10) Patent No.: US 11,226,158 B2
(45) Date of Patent: Jan. 18, 2022

(54) HEAT EXCHANGER FRACTAL SPLITTER

(71) Applicant: Hamilton Sundstrand Corporation, Charlotte, NC (US)

(72) Inventor: James Streeter, Torrington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 22 days.

(21) Appl. No.: 16/371,392

(22) Filed: Apr. 1, 2019

(65) Prior Publication Data

US 2020/0309459 A1 Oct. 1, 2020

(51) Int. Cl.
*F28D 1/02* (2006.01)
*F28D 1/047* (2006.01)

(52) U.S. Cl.
CPC ........... *F28D 1/0246* (2013.01); *F28D 1/047* (2013.01)

(58) Field of Classification Search
CPC ........ F28F 9/0268; F28F 9/028; F28F 9/0202; F28F 9/0204; F28F 9/0207; F28F 9/026; F28F 9/0275; F28D 1/0246; F28D 1/047
See application file for complete search history.

(56) References Cited

U.S. PATENT DOCUMENTS

| | | | | |
|---|---|---|---|---|
| 9,810,150 B2 * | 11/2017 | Schmitz | F28F 9/0268 | |
| 2006/0011335 A1 * | 1/2006 | Ohata | F28F 9/0214 | 165/176 |
| 2014/0000841 A1 | 1/2014 | Baker et al. | | |
| 2014/0231057 A1 * | 8/2014 | Schalansky | F28F 3/048 | 165/169 |
| 2015/0107804 A1 * | 4/2015 | Glass | F28D 1/05308 | 165/133 |
| 2017/0023311 A1 * | 1/2017 | Urbanski | F28F 9/0268 | |
| 2017/0198988 A1 * | 7/2017 | Herring | F28F 9/0246 | |
| 2017/0266583 A1 * | 9/2017 | Crayssac | F28F 9/0275 | |
| 2018/0345425 A1 | 12/2018 | Caimano et al. | | |
| 2019/0024988 A1 * | 1/2019 | Wilson | F28F 9/0243 | |

(Continued)

FOREIGN PATENT DOCUMENTS

| | | | |
|---|---|---|---|
| DE | 102008015345 A1 * | 9/2009 | F28F 9/0268 |
| EP | 0094987 A2 * | 11/1983 | F22B 37/228 |
| EP | 3410054 A1 | 12/2018 | |

(Continued)

OTHER PUBLICATIONS

Extended European Search Report for EP Application No. 19213646.3, dated Jun. 22, 2020, 9 pages.

(Continued)

*Primary Examiner* — Tho V Duong
(74) *Attorney, Agent, or Firm* — Kinney & Lange, P.A.

(57) ABSTRACT

A flow manifold for a heat exchanger core includes a number of fractal flow splitters arranged in a grid pattern of layers each fluidly connected to a corresponding first circuit layer, a flow plenum having a number of flow channels that are fluidly connected to an associated fractal flow splitter, one or more flow dividing vanes located in each flow channel thereby dividing the associated flow channel into two or more sub-channels, and an outer manifold surrounding the fractal flow splitters and configured to direct a first circuit flow into or out of the heat exchanger core. Each fractal flow splitter has an open end and a plenum end, and provides a transition from the open end to the flow plenum.

13 Claims, 6 Drawing Sheets

(56) References Cited

U.S. PATENT DOCUMENTS

| | | | | |
|---|---|---|---|---|
| 2019/0024989 | A1 | 1/2019 | Wilson et al. | |
| 2019/0285364 | A1 * | 9/2019 | Streeter | B22F 7/062 |

FOREIGN PATENT DOCUMENTS

| | | | | | |
|---|---|---|---|---|---|
| FR | 1396037 | A | * | 4/1965 | B01D 1/04 |
| FR | 3016027 | A1 | * | 7/2015 | F28F 13/06 |
| GB | 1413473 | A | * | 11/1975 | F28F 9/0268 |
| JP | 2004011939 | A | * | 1/2004 | F28F 9/0268 |
| WO | WO2011/115883 | A2 | | 9/2011 | |
| WO | WO2016/057443 | A1 | | 4/2016 | |
| WO | WO2016/096965 | A1 | | 6/2016 | |
| WO | WO2017/008108 | A1 | | 1/2017 | |
| WO | WO2019/025691 | A1 | | 2/2019 | |

OTHER PUBLICATIONS

Office Action dated Dec. 2, 2020, received for corresponding U.S. Appl. No. 16/371,392, 11 pages.

* cited by examiner

HEAT EXCHANGER FRACTAL SPLITTER

BACKGROUND

The present disclosure relates to heat exchangers, and more particularly, to a heat exchanger manifold design that improves the thermal robustness of the heat exchanger.

Heat exchangers are well known in the aviation arts and in other industries for providing a compact, low-weight, and highly-effective means of exchanging heat from a hot fluid to a cold fluid. Heat exchangers that operate at elevated temperatures often have short service lives and/or require increased maintenance as a result of high cyclic thermal stress. The stress is caused by multiple system and component factors including rapid flow and/or temperature transients, geometric discontinuities, stiffness discontinuities, mass discontinuities, and materials of construction. For example, inlet and outlet manifolds are typically pressure vessels that are welded or bolted to a heat exchanger core or matrix. Pressure requirements dictate the thickness of these manifolds, sometimes resulting in a relatively thick header attached to a thinner core matrix. This mismatch in thickness and mass, while acceptable for pressure loads, conflicts with the goal of avoiding discontinuities to limit thermal stress. Heat exchangers that operate at elevated temperatures, such as those in modern aircraft engines, often have short service lives due to high steady state and cyclic thermal stresses.

SUMMARY

A flow manifold for a heat exchanger core that has alternating first circuit layers and second circuit layers includes a number of fractal flow splitters arranged in a grid pattern having at least two layers, each fluidly connected to a corresponding first circuit layer, a flow plenum having a number of flow channels, each fluidly connected to an associated fractal flow splitter, a number of flow dividing vanes, each located within a flow channel and configured to divide the associated flow channel into two or more sub-channels, and an outer manifold surrounding the fractal flow splitters and configured to direct a first circuit flow into/out of the heat exchanger core. Each of the fractal flow splitters has an open end and a plenum end, and provides a transition from the open end to the flow plenum. Each fractal flow splitter directs a portion of the first circuit flow toward, or away from, one or more of the flow dividing vanes, thereby directing flow into, or away from, the two or more flow sub-channels.

A method of manufacturing a flow manifold for a heat exchanger core that has alternating first circuit layers and second circuit layers includes the following steps: forming a flow plenum having a number of flow channels that are each fluidly connected to an associated fractal flow splitter and a number of flow dividing vanes, each located within a flow channel and configured to divide the associated flow channel into two or more sub-channels, forming a number of fractal flow splitters arranged in a grid pattern, each attached to an associated flow channel, and forming an outer manifold surrounding the fractal flow splitters. Each fractal flow splitter is metallurgically joined to an associated flow channel, and the outer manifold is metallurgically joined to the heat exchanger core.

DETAILED DESCRIPTION

Figure 1:
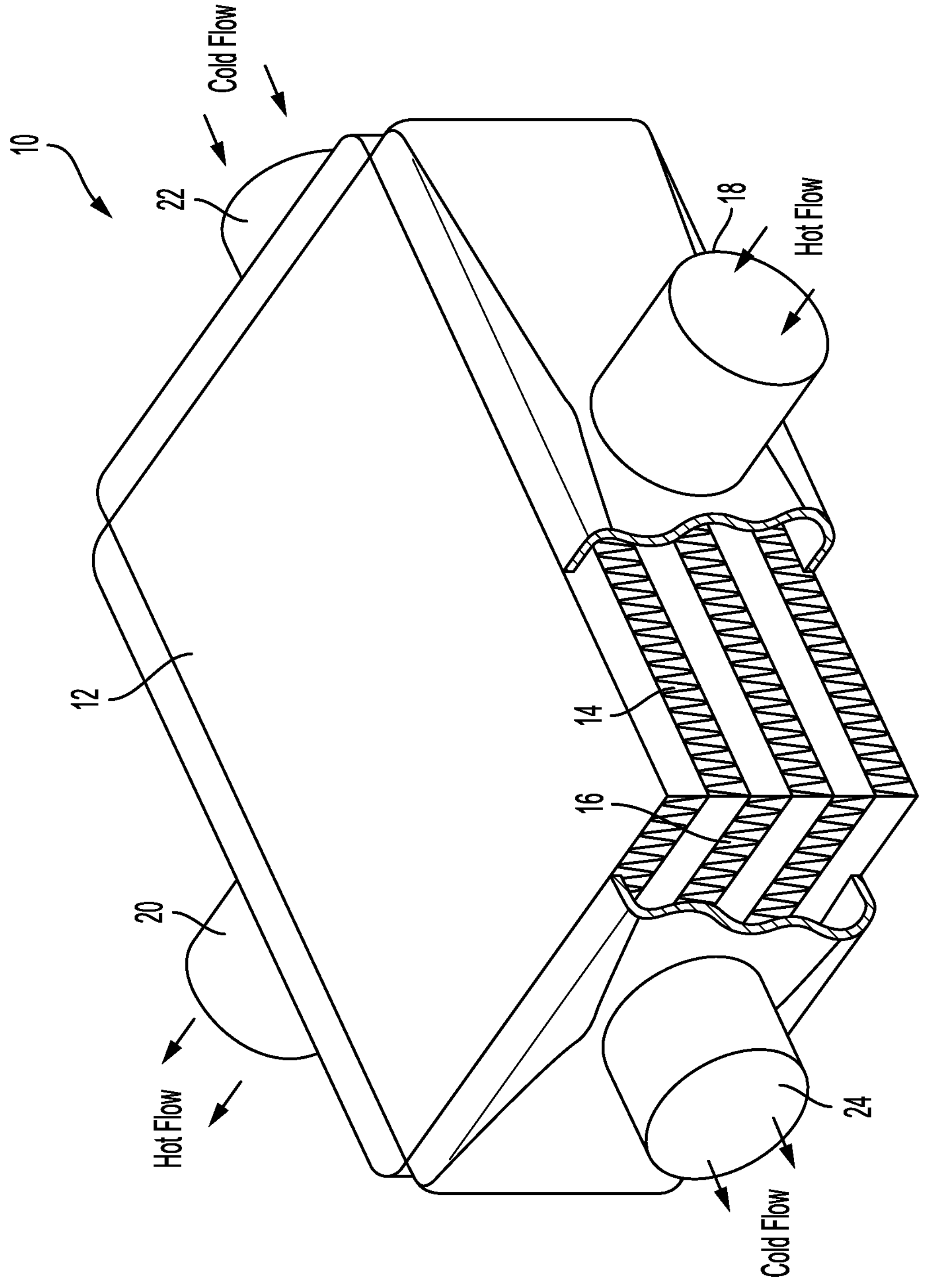
FIG. 1 is a perspective view of a plate-fin heat exchanger of the prior art.

FIG. 1 is a perspective view of a plate-fin heat exchanger of the prior art. Shown in FIG. 1 are heat exchanger 10, heat exchanger core 12, hot layers 14, cold layers 16, hot inlet manifold 18, hot outlet manifold 20, cold inlet manifold 22, and cold outlet manifold 24. Heat exchanger core 10 includes alternating hot layers 14 and cold layers 16 that are sandwiched between top and bottom end sheets (not labeled), with parting sheets and closure bars (not labeled) providing flow isolation between alternating hot and cold layers 14, 16. Hot inlet manifold 18 receives a hot circuit flow from an external system, directing the hot flow into hot layers 14, and hot outlet manifold 20 receives the hot flow from hot layers 14, directing the hot flow to an external system. Similarly, cold inlet manifold 22 receives a cold circuit flow from an external system and directs the cold flow into cold layers 16, and cold outlet manifold 24 directs the cold flow from cold layers 16 to an external system. Hot inlet and outlet manifolds 18, 20 and cold inlet and outlet manifolds 22, 24 are pressure vessels having wall thickness that are adequate to contain the pressure (i.e., force acting over an area) of the working fluids, thereby resulting in a size and mass mismatch between the various components of heat exchanger 10.

The present disclosure is directed at an additively-manufactured fractal flow splitter for an additively-manufactured heat exchanger core. For the sake of illustrating and describing the present disclosure, a fractal splitter (i.e., fractal flow splitter) is shown in an exemplary embodiment on the inlet and outlet of the hot layers of a heat exchanger core. Accordingly, the hot circuit of a heat exchanger is disclosed. It is to be appreciated that a heat exchanger utilizing the fractal splitter of the present embodiment also includes a cold circuit, which can include inlet and outlet manifolds that can be similar to the fractal splitter of the present disclosure. Because a heat exchanger transfers heat from one fluid to another while maintaining a fluid separation between the two, heat will generally flow from the hot fluid to the cold fluid across the various components in the heat exchanger. Therefore, as used in this disclosure, "hot" will be used to describe the first fluid circuit and "cold" will be used to describe the second fluid circuit. The terms "hot" and "cold" are relative one to the other. As used in different embodiments, the heat exchanger core can encounter temperatures ranging from near absolute zero (for example, in cryogenic distillation) to 1,000 deg. F (538 deg. C) or more (for example, in gas turbine engine systems and related components). Moreover, "hot" and "cold" are used in this disclosure as descriptive terms to refer to the various components that are associated with the respective first and second fluid circuits in the heat exchanger core, without implying that particular temperatures or a temperature relationship exists for those components during the manufacturing process of the heat exchanger core.

Figure 2:
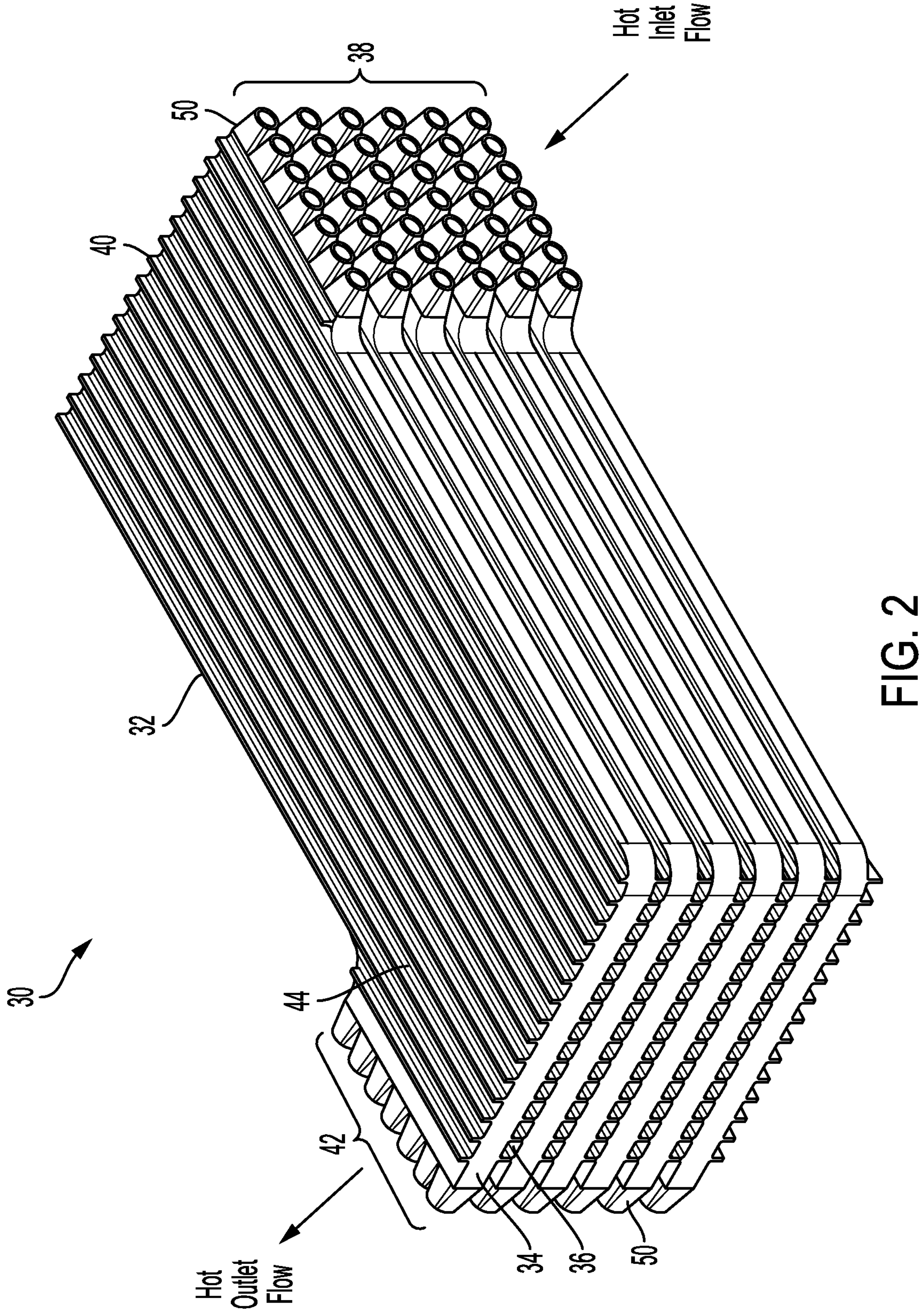
FIG. 2 is a perspective view of a heat exchanger with fractal flow splitters.

FIG. 2 is a perspective view of a heat exchanger with fractal splitters. Shown in FIG. 2 are heat exchanger 30, heat exchanger core 32, hot layer 34, cold layer 36, inlet 38, inlet manifold 40, outlet 42, outlet manifold 44, and fractal splitters 50. Heat exchanger core 32 includes a number of alternating hot layers 34 and cold layers 36, each containing the fluid of the respective hot and cold circuits. As described above, attention is given to the hot circuit of heat exchanger 30. Inlet 38 receives a hot inlet flow, directing it through hot manifold 40 into heat exchanger core 32 where the majority of the heat transfer (i.e., heat exchange) takes place between the hot circuit and the cold circuit (not shown in FIG. 2). After passing through heat exchanger core 32, the hot fluid flows through outlet manifold 44, and out through outlet 42. Inlet manifold 40 can also be called an inlet flow plenum, or an inlet plenum. Similarly, outlet manifold 44 can also be called an outlet flow plenum, or an outlet plenum. Inlet manifold 40 and outlet manifold 44 can be referred to as flow manifolds. It is to be appreciated that heat exchange between the hot circuit and the cold circuit also takes place at inlet manifold 40 (i.e., inlet plenum) and outlet manifold 44 (i.e., outlet plenum). Inlet 38 and outlet 42 are each comprised of a number of fractal splitters 50, which will be described in detail in FIGS. 4A-4D. An outer manifold (not shown in FIG. 2) directs the hot inlet and outlet flows into and out of inlet 38 and outlet 42, respectively.

Heat exchanger 30 (including heat exchanger core 32, hot layers 34, cold layers 36, inlet 38, inlet manifold 40, outlet 42, outlet manifold 44, and fractal splitters 50) can be formed by an additive manufacturing process. Additive manufacturing is also useful in building and tailoring internal features of heat exchanger core 32 and/or in forming inlet and outlet outer manifolds (not shown in FIG. 2). In an exemplary embodiment, powder bed fusion can be used as an additive manufacturing process to fabricate heat exchanger 30 from metallic materials. Non-limiting examples of metallic materials that can be used include nickel, aluminum, titanium, copper, iron, cobalt, and all alloys that include these various metals. In some embodiments, various alloys of INCONEL™ can be used to fabricate heat exchanger 30, with Inconel 625 and Inconel 718 being two exemplary alloy formulations. In other embodiments, HAYNES™ 282 can be used in fabricating heat exchanger 30. In yet other embodiments, alloys of aluminum can be used in fabricating heat exchanger 30. For example, an alloy of aluminum known as A205 can be used in fabricating heat exchanger 30. All materials that include metals, metal oxides, and alloys thereof in fabricating heat exchanger 30 are within the scope of the present disclosure.

Figure 3B:
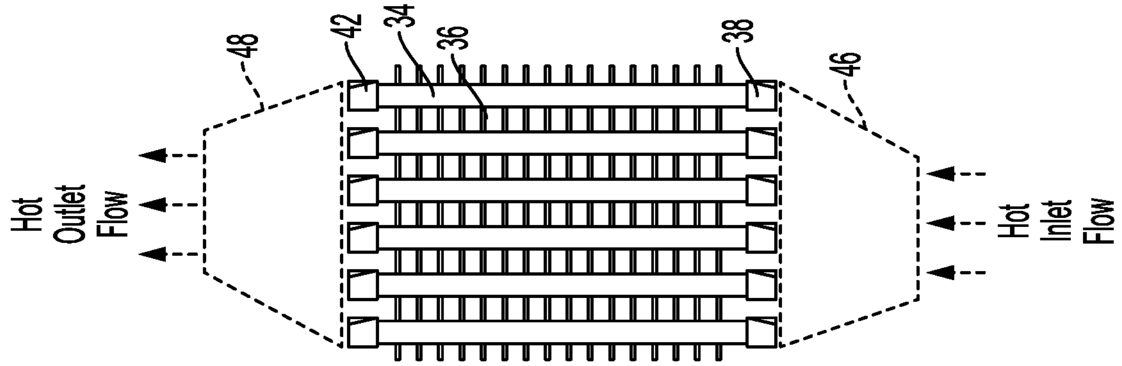
FIG. 3B is a front view of the heat exchanger shown in FIG. 2.
Figure 3A:
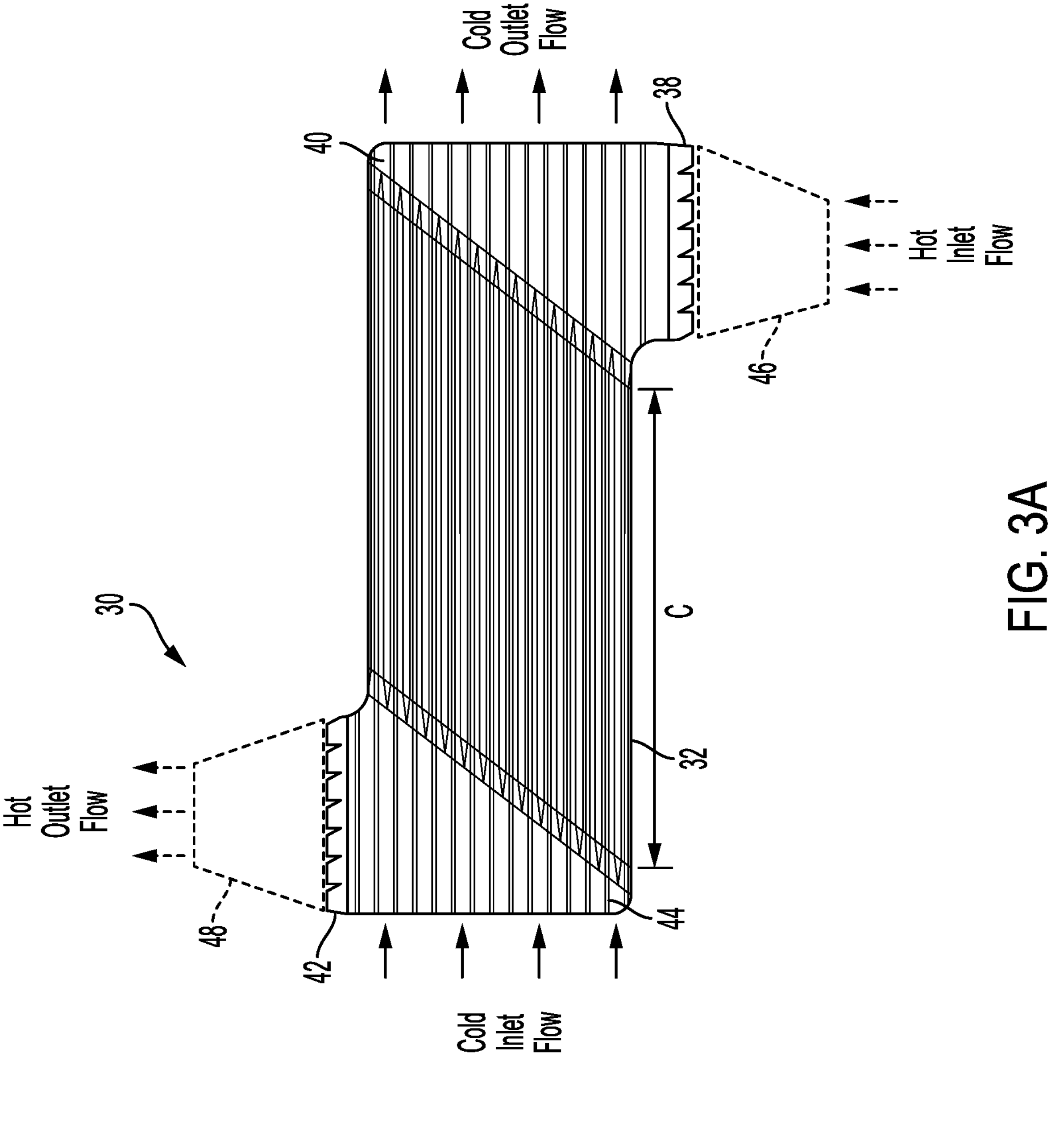
FIG. 3A is a top view of the heat exchanger shown in FIG. 2.

FIG. 3A is a top view of heat exchanger 30 shown in FIG. 2, and FIG. 3B is a front view of heat exchanger 30. Shown in FIGS. 3A-3B are heat exchanger 30, heat exchanger core 32, hot layer 34, cold layer 36, inlet 38, inlet manifold 40, outlet 42, outlet manifold 44, inlet outer manifold 46, and outlet outer manifold 48. The descriptions of heat exchanger 30, heat exchanger core 32, hot layer 34, cold layer 36, inlet

38, inlet manifold 40, outlet 42, and outlet manifold 44 are substantially similar to those provided above in regard to FIG. 2. Inlet outer manifold 46 receives the hot circuit flow from an external system (not shown), and outlet outer manifold 48 delivers the hot circuit flow to the external system. Inlet outer manifold 46 and outlet outer manifold 48 can be referred to as outer manifolds. Core length (C) is also labeled in FIG. 3A, depicting the core length in which active heat transfer (i.e., heat exchange) takes place between the hot and cold circuits in heat exchanger core 32. In the illustrated embodiment, heat exchanger core 32, when viewed from the top, has an outer geometric shape similar to a parallelogram. Accordingly, the dimension of core length (C) is generally equivalent to the base of the parallelogram. In the illustrated embodiment, core length (C) is about 6 inches (15 cm). In some embodiments, core length (C) can range from about 2-24 inches (5-61 cm). In other embodiments, core length (C) can be less than 2 inches (5 cm) or more than 24 inches (61 cm). It is to be appreciated that in some embodiments of heat exchanger core 32, core length (C) can scale with the height and width (not labeled) of heat exchanger core 32. In a particular embodiment of heat exchanger core 32, core length (C) can be zero or nearly zero. Therefore, in that particular embodiment, all or nearly all of the heat exchange will take place at inlet manifold 40 and outlet manifold 44.

Figures 4A, 4B, 4C, 4D:
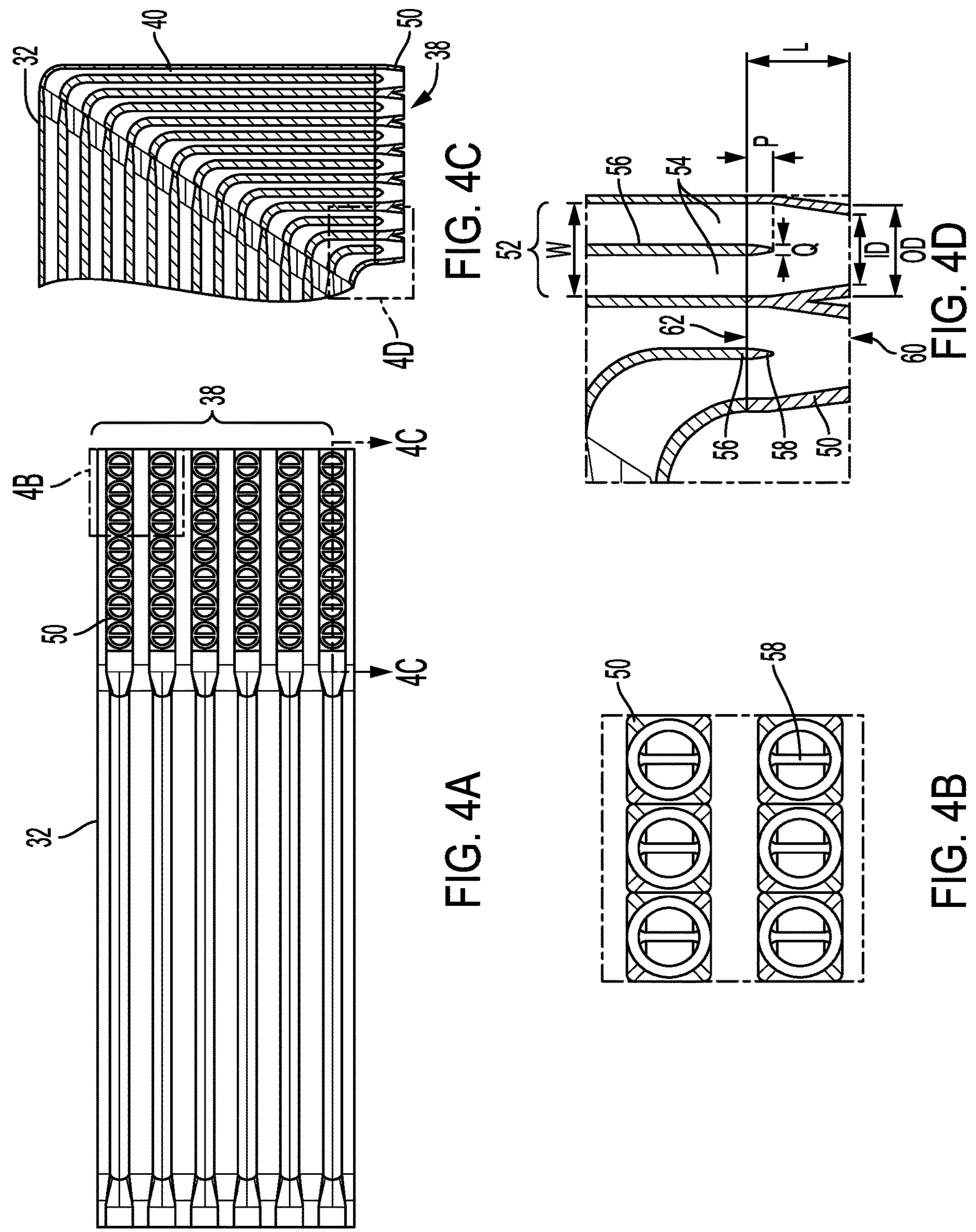
FIG. 4A is a side view of the heat exchanger shown in FIG. 2.
FIG. 4B is a side view showing the detail of the fractal flow splitters shown in FIG. 4A.
FIG. 4C is cross-sectional top view of the inlet manifold and fractal flow splitters shown in FIG. 4A.
FIG. 4D is a cross-sectional top view showing the detail of the fractal flow splitters shown in FIG. 4C.

FIG. 4A is a side view of heat exchanger 30 shown in FIG. 2. FIG. 4B is a side view showing the detail of fractal splitters 50 shown in FIG. 4A. FIG. 4C is cross-sectional top view of inlet 38 and inlet manifold 40 shown in FIG. 4A. FIG. 4D is a cross-sectional top view showing the detail of inlet manifold 40 and fractal splitters 50 shown in FIG. 4C. Shown in FIGS. 4A-4D are heat exchanger core 32, inlet 38, inlet manifold 40, fractal splitters 50, flow channels 52, flow sub-channels 54, flow dividing vanes 56, and vane tips 58. The descriptions of heat exchanger core 32, inlet 38, inlet manifold 40, and fractal splitters 50 are substantially similar to those provided above in regard to FIG. 2. Inlet manifold 40 and outlet manifold 44 are each metallurgically joined to heat exchanger core 32. Inlet manifold 40 includes a number of flow channels 52, with each flow channel 52 being connected to an associated fractal splitter 50. Accordingly, each fractal splitter 50 directs flow into an associated flow channel 52. Each fractal splitter 50 is metallurgically joined to an associated flow channel 52. Each flow channel 52 is divided into two or more flow sub-channels 54 by one or more flow dividing vanes 56. Each flow dividing vane 56 has vane tip 58 which extends into the associated fractal splitter 50 by protrusion length P. Each flow channel 52 in inlet manifold 40 changes the direction of fluid flow by about 90 deg. as the fluid flows from fractal splitter 50 to heat exchanger core 32. Each fractal splitter 50 has open end 60 and plenum end 62, with open end 60 pointing away from inlet manifold 40 and plenum end 62 pointing toward inlet manifold 40 (i.e., inlet plenum) and being attached to a corresponding flow channel 52. In the embodiment shown in FIG. 4A, inlet 38 includes six layers (i.e., rows), with each layer corresponding to a respective hot layer 34. This number of rows (e.g., six) can be referred to as the number of fractal splitters 50 in the vertical direction. Each layer (i.e., row) includes seven fractal splitters 50. This number (e.g., seven) can be referred to as the number of fractal splitters 50 in the horizontal direction. Accordingly, inlet 38 can be described as a matrix (i.e., grid pattern) of fractal splitters 50 arranged in six rows and seven columns. In the illustrated embodiment, heat exchanger 30 has an approximately rectangular cuboid (i.e., boxlike) shape, with the hot inlet and outlet flows being at approximately 90 deg. angles to the direction of flow in core 32. Accordingly, inlet manifold 40 and outlet manifold 44 each change the direction of fluid flow by about 90 deg. In other embodiments, heat exchanger 30, inlet manifold 40, and/or outlet manifold 44 can have different geometric shapes (i.e., other than a rectangular cuboid). In these other embodiments, inlet manifold 40 and/or outlet manifold 44 can change the direction of fluid flow by an angle ranging from 0-120 deg.

Referring to FIGS. 4B and 4D, each fractal splitter 50 has fractal splitter length (L), and a circular shape at open end 60 having inside diameter (ID) and outside diameter (OD). Accordingly, each fractal splitter 50 is configured to provide a transition from open end 60 to plenum end 62. Each flow channel 52 has channel width (W), and each flow dividing vane 56 has vane thickness (Q). In some embodiments, fractal splitters 50 can have other geometric shapes at open end 60. For example, in a particular embodiment, some fractal splitters can have an oval, oblong, or elliptical shape. Accordingly, inside and outside dimensions in each of the major and minor axes can be used to characterize these fractal splitters.

Referring again to FIG. 4D, vane tip 58 protrudes into fractal splitter 50 by protrusion length (P). The ratio of protrusion length (P) to fractal splitter length (L) can be referred to at the protrusion ratio, and can be used to characterize the design of vane tips 58. In the illustrated embodiment, the protrusion ratio is about 0.2. The protrusion ratio can also be expressed as a percentage. Accordingly, in the illustrated embodiment, the protrusion ratio is about 20%. In some embodiments, the protrusion ratio can range from 10-80%. In some of these embodiments, the protrusion ratio can range from about 30-60%. In other embodiments, the protrusion ratio can be less than 10% or more than 80%. For example, a protrusion ratio of 0% means that vane tip 58 does not protrude into fractal splitter 50.

In the illustrated embodiment, channel width (W) is about 0.10 inch (2.5 mm). In some embodiments, channel width (W) can range from 0.08-0.125 inch (2-3.2 mm). In other embodiments, channel width (W) can range from 0.03-0.5 inch (0.8-13 mm). In yet other embodiments, channel width (W) can be less than 0.03 inch (0.8 mm) or greater than 0.5 inch (13 mm). In the illustrated embodiment, fractal splitter length (L) is about 0.1 inch (2.5 mm). In some embodiments, fractal splitter length (L) can range from 0.08-0.125 inch (2-3.2 mm). In other embodiments, fractal splitter length (L) can range from 0.03-0.5 inch (0.8-13 mm). In yet other embodiments, fractal splitter length (L) can be less than 0.03 inch (0.8 mm) or greater than 0.5 inch (13 mm). In the illustrated embodiment, outside diameter (OD) is about 0.08 inch (2 mm). In some embodiments, outside diameter (OD) can range from 0.06-0.1 inch (1.5-2.5 mm). In other embodiments, outside diameter (OD) can range from 0.04-0.5 inch (1-13 mm). In yet other embodiments outside diameter (OD) can be less than 0.04 inch (1 mm) or greater than 0.5 inch (13 mm). In the illustrated embodiment, inside diameter (ID) is about 0.06 inch (1.5 mm). In some embodiments, inside diameter (ID) can range from 0.04-0.08 inch (1-2 mm). In other embodiments, inside diameter (ID) can range from 0.03-0.5 inch (0.8-13 mm). In yet other embodiments inside diameter (ID) can be less than 0.03 inch (0.8 mm) or greater than 0.5 inch (13 mm). It is to be appreciated that in a particular embodiment, inside diameter (ID) is less than outside diameter (OD). In the illustrated embodiment, vane thickness (Q) is about 0.012 inch (0.3 mm). In some embodiments, vane thickness (Q) can range from 0.003-0.02 inch (0.08-0.5 mm). In yet other embodiments vane thickness (Q) can be less than 0.003 inch (0.08 mm) or greater than 0.02 inch (0.5 mm).

Figure 5B:
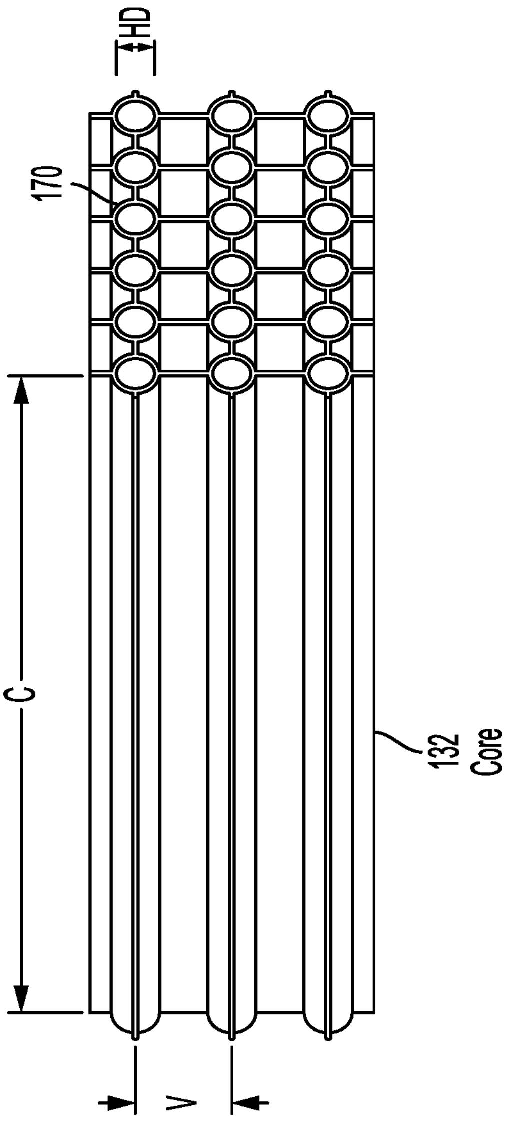
FIG. 5B is a schematic drawing showing a side view of the heat exchanger core shown in FIG. 5A.
Figure 5A:
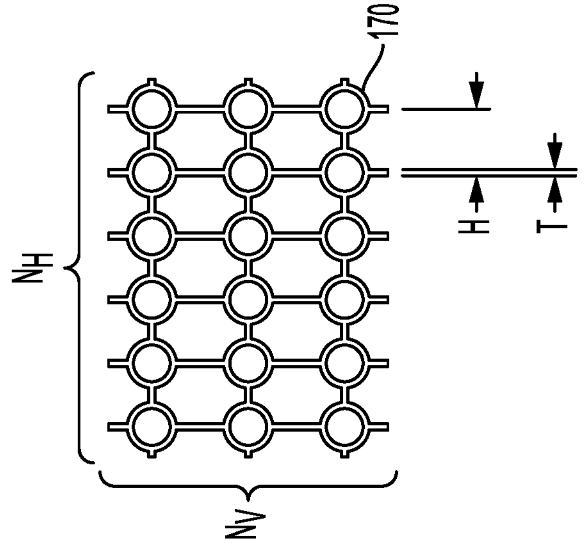
FIG. 5A is a schematic drawing showing the inlet geometry of a second embodiment of a heat exchanger core that can be adapted for use with fractal flow splitters.

FIG. 5A is a schematic drawing showing the inlet geometry of a second embodiment of a heat exchanger core that can be adapted for use with fractal flow splitters 50. FIG. 5B is a schematic drawing showing a side view of the heat exchanger core shown in FIG. 5A. Shown in FIGS. 5A-5B are heat exchanger core 132 and core channels 170. It is to be appreciated that fractal splitters 50 are not shown in FIGS. 5A-5B, but that heat exchanger core 132 can be adapted for use with fractal splitters 50. In the illustrated embodiment, heat exchanger core 132 can be described as a matrix of core channels 170 arranged in three rows and six columns. The number of rows (e.g., three) can be referred to as the vertical number ($N_V$), and the number of columns (e.g., six) can be referred to as the horizontal number ($N_H$). It is to be appreciated that references to vertical and horizontal are arbitrary with respect to the embodiment illustrated in FIGS. 5A-5B, without limiting the orientation of heat exchanger core 132 in a particular configuration. As shown in FIGS. 4C-4D, fractal splitter 50 and associated flow dividing vane 56 divided a flow entering a particular fractal splitter 50 into two flow sub-channels 54. Each particular flow sub-channel 54 in inlet manifold 40 delivers a flow stream to an associated core channel 170.

Referring again to FIGS. 5A-5B, several dimensions are labeled, as follows. Core length (C) depicts the core length in which core heat transfer (i.e., heat exchange) takes place between the hot and cold circuits in heat exchanger core 132. Each core channel 170 has a circular shape at the open end (not labeled), the circular shape being characterized as having hot diameter (HD). Adjacent rows of core channels 170 have vertical spacing (V), and adjacent columns of core channels 170 have horizontal spacing (H). In the illustrated embodiment, vertical spacing (V) is about 0.25 inch (6.4 mm). In some embodiments, vertical spacing (V) can range from 0.2-0.3 inch (5-7.5 mm). In other embodiments, vertical spacing (V) can range from 0.075-0.5 inch (1.9-13 mm). In the illustrated embodiment, horizontal spacing (H) about 0.1 inch (2.5 mm). In some embodiments, horizontal spacing (H) can range from 0.06-0.12 inch (1.5-3.0 mm). In other embodiments, horizontal spacing (H) can range from 0.04-0.5 inch (1-13 mm). Each core channel 170 has an associated core thickness (T). In the illustrated embodiment, core thickness (T) is about 0.012 inch (0.3 mm). In some embodiments, core thickness (T) can range from 0.003-0.02 inch (0.08-0.5 mm). In yet other embodiments vane thickness (Q) can be less than 0.003 inch (0.08 mm) or greater than 0.02 inch (0.5 mm). In some embodiments, it can be helpful for core thickness (T) to be similar to vane thickness (Q), with vane thickness (Q) shown in FIG. 4D. In other embodiments, core thickness (T) can be different from vane thickness (Q).

In the exemplary embodiment shown in FIGS. 5A-5B, the vertical number ($N_V$) is three and the horizontal number ($N_H$) is six. Accordingly, heat exchanger core 132 can be referred to as a 3×6 matrix of core channels 170. Referring back to the description of flow sub-channels 54 in regard to FIG. 4D, each flow channel 52 is divided into two or more flow sub-channels 54 by one or more flow dividing vanes 56. For example, in a particular embodiment, one or more flow channels 52 can have two flow dividing vanes 56 that divide associated flow channel 52 into three flow sub-channels 54. Accordingly, the three exemplary flow sub-channels 54 would be configured to deliver flow to three core channels 170. It is to be appreciated that in a particular embodiment, the number of flow dividing vanes 56 in any particular flow channel 52 can be different from the number of flow dividing vanes 56 in another flow channel 52, thereby resulting in practically any combination of vertical number ($N_V$) and horizontal number ($N_H$) of core channels 170. Accordingly, in a particular embodiment, the horizontal number ($N_H$) of core channels 170 does not need to be an even number, as shown in the illustrated embodiment. As noted above in regard to FIG. 4A, in some embodiments heat exchanger core 32, 132 can have a geometric shape other than rectangular cuboid. Accordingly, in other embodiments, various rows and/or columns can have different numbers of core channels 70, 170 from other rows and/or columns. In some embodiments, the vertical number ($N_V$) and/or the horizontal number ($N_H$) can each range from 2-100. In other embodiments, the vertical number ($N_V$) and/or the horizontal number ($N_H$) can be greater than 100. Any vertical number ($N_V$) and/or horizontal number ($N_H$) of core channels 170 is within the scope of the present disclosure. It is to be appreciated that several factors can help determine the vertical number ($N_V$) and horizontal number ($N_H$) in a particular embodiment, with non-limiting examples including the number of layers (i.e., hot and/or cold layers), the physical size of a particular heat exchanger core, the pressure, temperature, viscosity, and flowrate of the working fluid, and whether a phase change occurs in the working fluid (e.g., liquid to gas, gas to liquid).

In the embodiments shown in FIGS. 2 and 5B, heat exchanger cores 32, 132 can be characterized as having a straight profile (i.e., straight core channels 170). All other core configurations are within the scope of the present disclosure. For example, a heat exchanger core with wavy (i.e., non-straight) core channels can provide aerodynamic, hydrodynamic, and/or thermodynamic advantages over a core having generally straight core channels in some embodiments.

Figure 6:
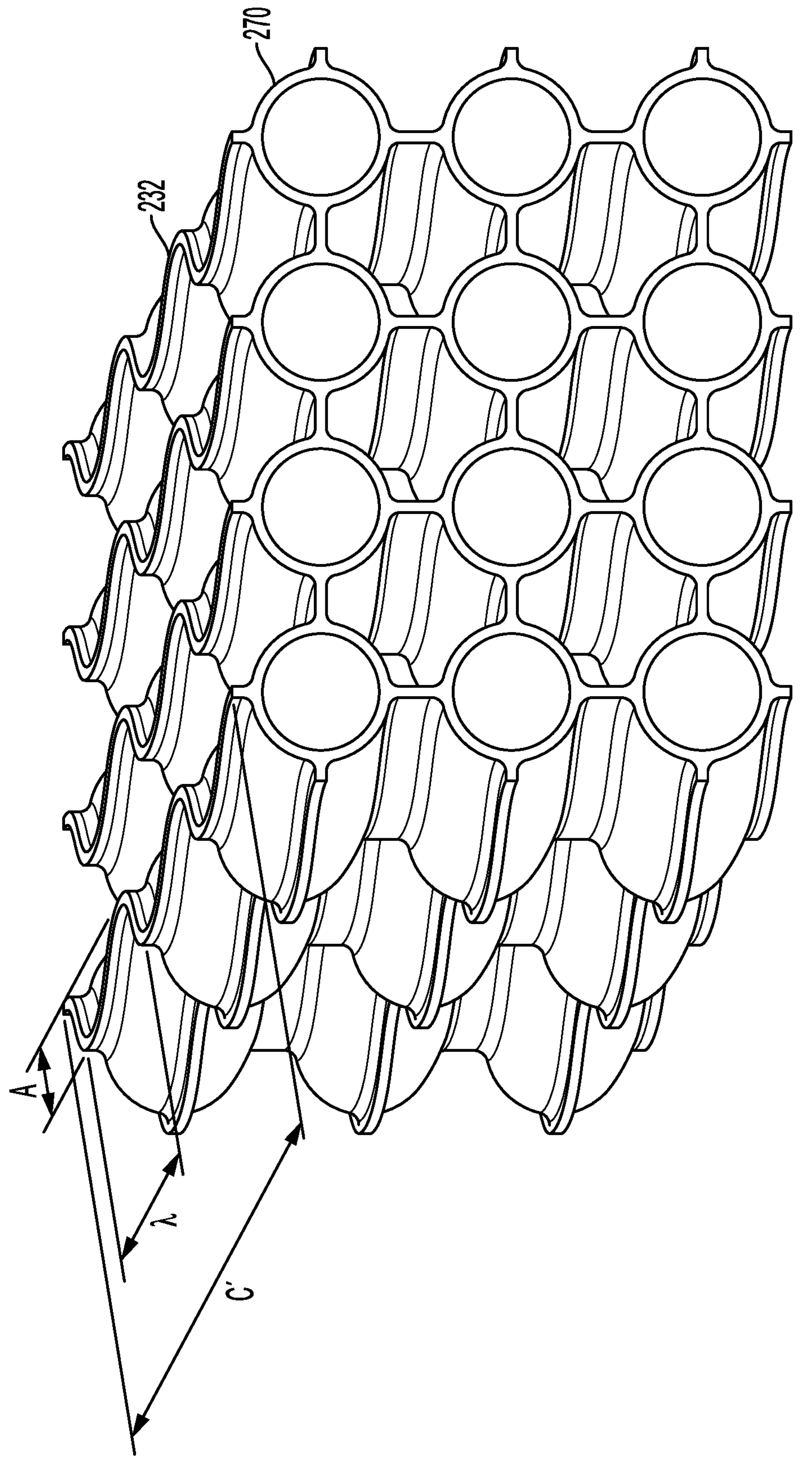
FIG. 6 is a perspective view of a third embodiment of a heat exchanger core that can be adapted for use with fractal flow splitters.

FIG. 6 is a perspective view of a third embodiment of a heat exchanger core that can be adapted for use with fractal flow splitters 50. Shown in FIG. 6 are heat exchanger core 232 and core channels 270. Several dimensions are labeled, as follows. Core length (C') depicts the core length in which core heat transfer (i.e., heat exchange) takes place between the hot and cold circuits in heat exchanger core 232. Core channels 270 have a sinusoidal (i.e., sinuous) shape that can be characterized by peak-to-peak amplitude (A) and wavelength (λ). Peak-to-peak amplitude (A) can also be abbreviated as $A_{Pk\text{-}Pk}$ to distinguish it from the base-to-peak amplitude (i.e., one-half the value of the peak-to-peak amplitude (A)). In the exemplary embodiment shown in FIG. 6, peak-to-peak amplitude (A) is about 0.05 inch (1.3 mm) and wavelength (λ) is about 0.375 inch (9.5 mm). Accordingly, the ratio of peak-to-peak amplitude (A) to wavelength (λ) is about 0.13. In some embodiments, the ratio of peak-to-peak amplitude (A) to wavelength (λ) can range from 0.05-0.3. In other embodiments, the ratio of peak-to-peak amplitude (A) to wavelength (λ) can be less than 0.05 or greater than 0.3. Heat exchanger core 232 having a sinuous shape (i.e., sinuous flow pattern through core channels 270) can increase the rate of heat transfer in a given core volume by improving the heat transfer coefficient as a result of the sinuous flow therethrough. It is to be noted, however, that a greater pressure drop across the core (i.e., head loss) can result from the sinuous flow as compared to a generally straight flow.

The present disclosure provides exemplary embodiments utilizing additive manufacturing processes. It is to be appreciated that additive manufacturing processes can be used to produce particularly complex core geometries. Additive manufacturing processes can be used to produce particularly complex core geometries, and other core geometries can be beneficial in particular embodiments. However, all manufacturing processes are within the scope of the present disclosure, including without limitation additive manufacturing, hybrid additive subtractive manufacturing, subtractive manufacturing, or casting.

Discussion of Possible Embodiments

A flow manifold for a heat exchanger core, the heat exchanger core comprising alternating first circuit layers and second circuit layers, the flow manifold comprising: a plurality of fractal flow splitters arranged in a grid pattern that comprises a plurality of vertical layers, each of the plurality of vertical layers fluidly connected to a corresponding first circuit layer, wherein two or more of the plurality of fractal flow splitters are in each vertical layer; a plurality of flow channels, each flow channel being fluidly connected to an associated fractal flow splitter; a plurality of flow dividing vanes, each disposed within a flow channel and configured to divide the associated flow channel into two or more sub-channels; and an outer manifold surrounding the plurality of fractal flow splitters and configured to direct a first circuit flow into, or out of, the flow manifold; wherein: each of the fractal flow splitters defines an open end and a plenum end, and is configured to provide a transition from the open end to the flow manifold; and each of the fractal flow splitters is configured to direct a portion of the first circuit flow toward, or away from, one or more of the flow dividing vanes, thereby directing flow into, or away from, the two or more sub-channels.

The flow manifold of the preceding paragraph can optionally include, additionally and/or alternatively, any one or more of the following features, configurations and/or additional components:

A further embodiment of the foregoing flow manifold, wherein: the heat exchanger core defines a first circuit flow axis; the flow manifold defines a manifold flow axis; the flow manifold changes a direction of the first circuit flow from the manifold flow axis to the first circuit flow axis by an angle that ranges from 0-120 deg.

A further embodiment of the foregoing flow manifold, wherein the flow manifold changes the direction of the first circuit flow from the manifold flow axis to the first circuit flow axis by an angle that is about 90 deg.

A further embodiment of the foregoing flow manifold, wherein: two adjacent first circuit layers define a vertical spacing; and the vertical spacing ranges from 0.075-0.5 inch (1.9-13 mm).

A further embodiment of the foregoing flow manifold, wherein the vertical spacing ranges from 0.2-0.3 inch (5-7.5 mm).

A further embodiment of the foregoing flow manifold, wherein: the flow channel defines a flow channel width; and the flow channel width ranges between 0.03-0.5 inch (0.8-13 mm).

A further embodiment of the foregoing flow manifold, wherein the flow channel width ranges from 0.08-0.125 inch (2-3.2 mm).

A further embodiment of the foregoing flow manifold, wherein: the fractal flow splitter open end defines an outside diameter (OD); and the outside diameter ranges from 0.04-0.5 inch (1-13 mm).

A further embodiment of the foregoing flow manifold, wherein the outside diameter ranges from 0.06-0.1 inch (1.5-2.5 mm).

A further embodiment of the foregoing flow manifold, wherein: the flow dividing vane defines a vane thickness; and the vane thickness ranges from 0.003-0.2 inch (0.08-5 mm).

A further embodiment of the foregoing flow manifold, comprising one or more materials selected from the group consisting of: nickel, aluminum, titanium, copper, iron, cobalt, and alloys thereof.

A further embodiment of the foregoing flow manifold, wherein: the fractal flow splitter defines a flow splitter length; the flow splitter length ranges from 0.03-0.5 inch (0.8-13 mm) the flow dividing vane at least partially enters the corresponding fractal flow splitter, defining an entrance length; a ratio of the entrance length to the flow splitter length defines a protrusion ratio; and the protrusion ratio ranges from 10-80%.

A further embodiment of the foregoing flow manifold, wherein the protrusion ratio ranges from 30-60%.

A further embodiment of the foregoing flow manifold, wherein: the heat exchanger core comprises a plurality of core channels; each of the plurality of core channels has a sinuous shape defining a peak-to-peak amplitude and a wavelength; and a ratio of the peak-to-peak amplitude to wavelength ranges from 0.05-0.3.

A further embodiment of the foregoing flow manifold, further comprising heat exchanger.

A method of manufacturing a flow manifold for a heat exchanger core, the heat exchanger core comprising alternating first circuit layers and second circuit layers, the method comprising the steps of: forming the flow manifold comprising: a plurality of flow channels, each fluidly connected to an associated fractal flow splitter; and a plurality of flow dividing vanes, each disposed within a flow channel and configured to divide the associated flow channel into two or more sub-channels; forming a plurality of fractal flow splitters arranged in a grid pattern comprising a plurality of vertical layers, each fractal flow splitter attached to an associated flow channel; and forming an outer manifold surrounding the plurality of fractal flow splitters; wherein: each of the plurality of fractal flow splitters is metallurgically joined to an associated flow channel; and the outer manifold is metallurgically joined to the heat exchanger core.

The method of the preceding paragraph can optionally include, additionally and/or alternatively, any one or more of the following features, configurations and/or additional components:

A further embodiment of the foregoing flow method, wherein: the heat exchanger core defines a first circuit flow axis; the flow manifold defines a manifold flow axis; the flow manifold changes a direction of the first circuit flow from the manifold flow axis to the first circuit flow axis by an angle that ranges from 0-120 deg.

A further embodiment of the foregoing flow method, wherein the flow manifold comprises one or more materials selected from the group consisting of: nickel, aluminum, titanium, copper, iron, cobalt, and alloys thereof.

A further embodiment of the foregoing flow method, wherein: the fractal flow splitter defines a flow splitter length; the flow splitter length ranges from 0.03-0.5 inch (0.8-13 mm); the flow dividing vane at least partially enters the corresponding fractal flow splitter, defining an entrance length; a ratio of the entrance length to the flow splitter length defines a protrusion ratio; and the protrusion ratio ranges from 10-80%.

A further embodiment of the foregoing flow method, wherein the protrusion ratio ranges from 30-60%.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flow manifold for a heat exchanger core, the heat exchanger core comprising alternating first circuit layers and second circuit layers, the flow manifold comprising:

- a plurality of fractal flow splitters arranged in a grid pattern that comprises a plurality of vertical layers, each of the plurality of vertical layers fluidly connected to a corresponding first circuit layer, wherein two or more of the plurality of fractal flow splitters are in each vertical layer;
- a plurality of flow channels, each flow channel being fluidly connected to an associated fractal flow splitter;
- a plurality of flow dividing vanes, each disposed within a flow channel and configured to divide the associated flow channel into two or more sub-channels; and
- an outer manifold surrounding the plurality of fractal flow splitters and configured to direct a first circuit flow into, or out of, the flow manifold;

wherein:

- each of the plurality of fractal flow splitters defines an open end and a plenum end, and is configured to provide a transition from the open end to one of the plurality of fluid flow channels;
- each of the plurality of fractal flow splitters is configured to direct a portion of the first circuit flow toward, or away from, one or more of the plurality of flow dividing vanes, thereby directing flow into, or away from, the two or more sub-channels;
- each of the plurality of fractal flow splitters defines a flow splitter length;
- the flow splitter length ranges from 0.03-0.5 inch (0.8-13 mm);
- each of the plurality of flow dividing vanes at least partially enters the corresponding fractal flow splitter, defining an entrance length;
- a ratio of the entrance length to the flow splitter length defines a protrusion ratio;
- the protrusion ratio ranges from 10-80%;
- each of the open ends has a circular, oval, oblong, or elliptical shape;
- two adjacent first circuit layers define a vertical spacing; and
- the vertical spacing ranges from 0.075-0.5 inch (1.9-13 mm).

2. The flow manifold of claim 1, wherein:

the heat exchanger core defines a first circuit flow axis;

the flow manifold defines a manifold flow axis;

the flow manifold changes a direction of the first circuit flow from the manifold flow axis to the first circuit flow axis by an angle that ranges from 0-120 deg.

3. The flow manifold of claim 2, wherein the flow manifold changes the direction of the first circuit flow from the manifold flow axis to the first circuit flow axis by an angle that is about 90 deg.

4. The flow manifold of claim 1, wherein the vertical spacing ranges from 0.2-0.3 inch (5-7.5 mm).

5. The flow manifold of claim 1, wherein:

the flow channel defines a flow channel width; and the flow channel width ranges between 0.03-0.5 inch (0.8-13 mm).

6. The flow manifold of claim 5, wherein the flow channel width ranges from 0.08-0.125 inch (2-3.2 mm).

7. The flow manifold of claim 1, wherein:

the fractal flow splitter open end defines an outside diameter (OD); and the outside diameter ranges from 0.04-0.5 inch (1-13 mm).

8. The flow manifold of claim 7, wherein the outside diameter ranges from 0.06-0.1 inch (1.5-2.5 mm).

9. The flow manifold of claim 1, wherein:

the flow dividing vane defines a vane thickness; and the vane thickness ranges from 0.003-0.2 inch (0.08-5 mm).

10. The flow manifold of claim 1, comprising one or more materials selected from the group consisting of: nickel, aluminum, titanium, copper, iron, cobalt, and alloys thereof.

11. The flow manifold of claim 1, wherein the protrusion ratio ranges from 30-60%.

12. The flow manifold of claim 1, wherein:

the heat exchanger core comprises a plurality of core channels;

each of the plurality of core channels has a sinuous shape defining a peak-to-peak amplitude and a wavelength; and a ratio of the peak-to-peak amplitude to wavelength ranges from 0.05-0.3.

13. A heat exchanger, comprising at least one of the flow manifolds of claim 1.

* * * * *